(12) United States Patent
Boyer

(10) Patent No.: US 12,197,307 B2
(45) Date of Patent: Jan. 14, 2025

(54) ADAPTIVE FEEDBACK TIMING SYSTEM

(71) Applicant: THE BOEING COMPANY, Chicago, IL (US)

(72) Inventor: Cristina Boyer, Edwardsville, IL (US)

(73) Assignee: THE BOIENG COMPANY, Arlington, VA (US)

( * ) Notice: Subject to any disclaimer, the term of this patent is extended or adjusted under 35 U.S.C. 154(b) by 579 days.

(21) Appl. No.: 17/404,304

(22) Filed: Aug. 17, 2021

(65) Prior Publication Data

US 2023/0058522 A1 Feb. 23, 2023

(51) Int. Cl.
| | |
|---|---|
| *G06F 11/34* | (2006.01) |
| *G09B 5/06* | (2006.01) |
| *G09B 7/00* | (2006.01) |
| *G09B 9/30* | (2006.01) |

(52) U.S. Cl.
CPC ...... *G06F 11/3438* (2013.01); *G06F 11/3457* (2013.01); *G09B 5/065* (2013.01); *G09B 7/00* (2013.01); *G09B 9/301* (2013.01)

(58) Field of Classification Search
CPC .... G09B 7/06; G06F 11/3438; G06F 11/3457
See application file for complete search history.

(56) References Cited

U.S. PATENT DOCUMENTS

2011/0039249 A1* 2/2011 Packard ................... G09B 7/06
434/362

* cited by examiner

*Primary Examiner* — Lam S Nguyen
(74) *Attorney, Agent, or Firm* — Moore IP Law

(57) ABSTRACT

An adaptive feedback timing system and method includes receiving, by a performance observation system, monitoring data associated with electronically monitoring a lesson by a variable feedback teaching device. Adaptive feedback timing also includes receiving, by the performance observation system, error detection data associated with the variable feedback teaching device automatically detecting an error made by a student during the lesson. After receiving the error detection data, a feedback pattern is automatically selected based on a performance history criterion. Feedback data is then communicated to the variable feedback teaching device for presentation to the student according to the automatically selected feedback pattern.

20 Claims, 5 Drawing Sheets

ADAPTIVE FEEDBACK TIMING SYSTEM

FIELD OF THE DISCLOSURE

The subject disclosure is generally related to control of automated learning systems.

BACKGROUND

To improve the efficiency of and access to instructional materials, myriad industries have introduced automated learning systems into their training and education curricula. As these systems proliferate, it is becoming increasingly important to improve the effectiveness and efficiency of such automated learning systems.

One method of improving the effectiveness and efficiency of automated learning systems is to improve the rate at which students effectively learn the presented material. A student's learning rate can be affected by the way they receive feedback. Certain current automated learning systems consider that feedback to users during instruction is an important part of the educational process. However, known automated learning systems are not structured to automatically deliver feedback in a manner that most efficiently improves automated learning objectives.

SUMMARY

In a particular implementation, a method includes receiving, by a performance observation system, monitoring data associated with electronically monitoring a lesson at a variable feedback teaching device. The method also includes receiving, by the performance observation system, error detection data associated with the variable feedback teaching device automatically detecting an error made by a student during the lesson. The method also includes, after receiving the error detection data, automatically selecting a feedback pattern based on a performance history criterion. The method also includes communicating feedback data to the variable feedback teaching device for presentation to the student according to the automatically selected feedback pattern.

In another particular implementation, a method includes communicating, to a performance observation system, monitoring data associated with electronically monitoring a lesson. The method also includes communicating, to the performance observation system, error detection data associated with automatically detecting an error made by a student during the lesson. The method also includes receiving, from the performance observation system, a feedback pattern automatically selected by the performance observation system based on a performance history criterion. The method also includes receiving feedback data from the performance observation system. The method also includes presenting the feedback data to the student according to the automatically selected feedback pattern.

In another particular implementation, a system includes a memory configured to store instructions and one or more processors configured to receive, by a performance observation system, monitoring data associated with electronically monitoring a lesson at a variable feedback teaching device. The one or more processors are also configured to receive, by the performance observation system, error detection data associated with the variable feedback teaching device automatically detecting an error made by a student during the lesson. The one or more processors are also configured to, after receiving the error detection data, automatically select a feedback pattern based on a performance history criterion. The one or more processors are also configured to communicate feedback data to the variable feedback teaching device for presentation to the student according to the automatically selected feedback pattern.

In another particular embodiment, a non-transient, computer-readable medium stores instructions that, when executed by one or more processors, cause the one or more processors to initiate, perform, or control operations including receiving, at a performance observation system, monitoring data associated with electronically monitoring a lesson at a variable feedback teaching device. The operations also include receiving, by the performance observation system, error detection data associated with the variable feedback teaching device automatically detecting an error made by a student during the lesson. The operations also include, after receiving the error detection data, automatically selecting a feedback pattern based on a performance history criterion. The operations also include communicating feedback data to the variable feedback teaching device for presentation to the student according to the automatically selected feedback pattern.

In another particular embodiment, a device includes means for receiving, at a performance observation system, monitoring data associated with electronically monitoring a lesson at a variable feedback teaching device. The device also includes means for receiving, by the performance observation system, error detection data associated with the variable feedback teaching device automatically detecting an error made by a student during the lesson. The device also includes means for, after receiving the error detection data, automatically selecting a feedback pattern based on a performance history criterion. The device also includes means for communicating feedback data to the variable feedback teaching device for presentation to the student according to the automatically selected feedback pattern.

The features, functions, and advantages described herein can be achieved independently in various implementations or can be combined in yet other implementations, further details of which can be found with reference to the following description and drawings.

DETAILED DESCRIPTION

Figure 1:
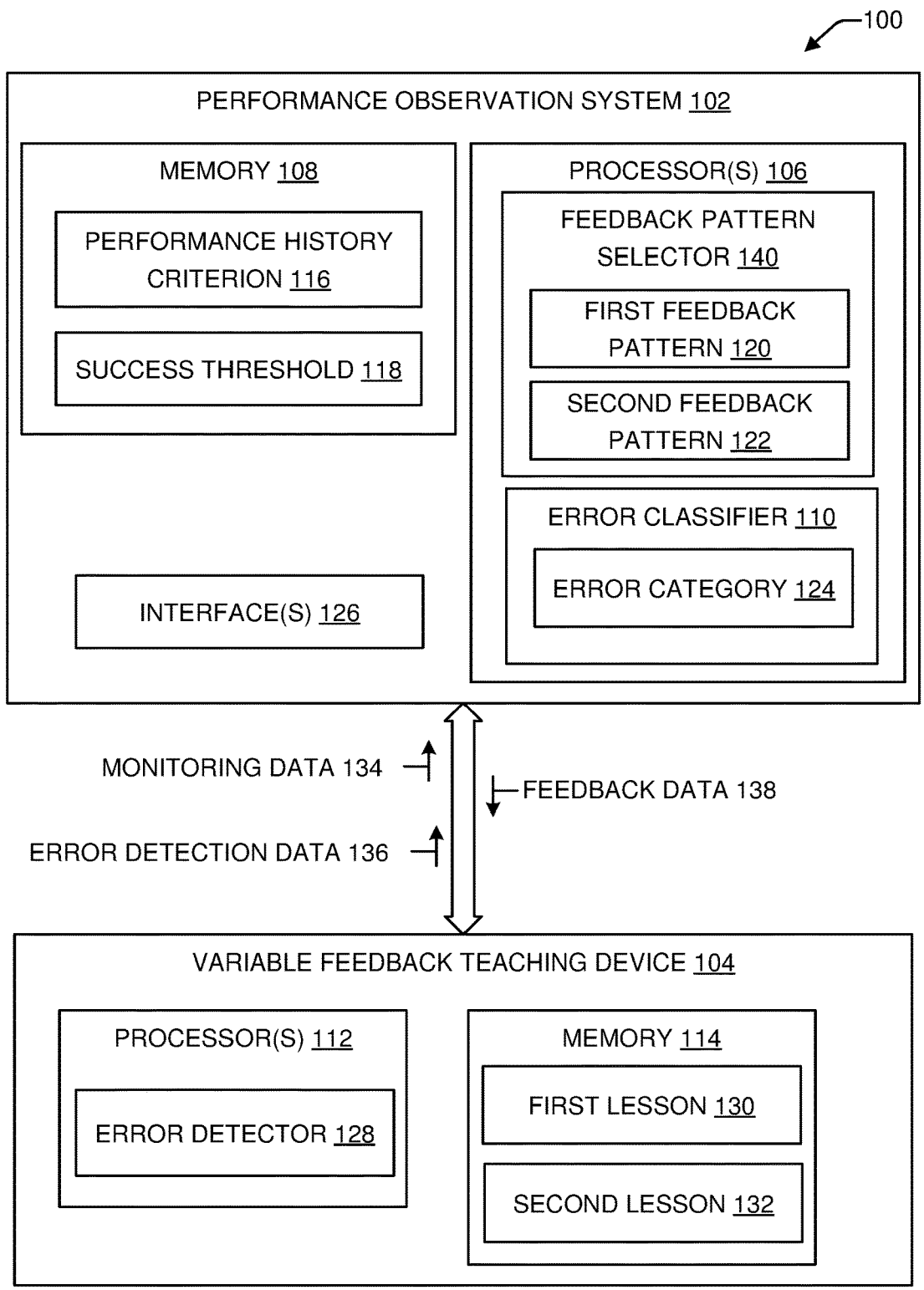
FIG. 1 depicts an example system for adaptive feedback, in accordance with the subject disclosure.

Aspects disclosed herein use an adaptive feedback timing system to improve the efficiency and effectiveness of automated learning systems, particularly by improving the manner in which automated learning systems deliver feedback to students as part of a lesson. Rather than provide feedback only at a particular, predefined moment in the lesson, the adaptive feedback timing system dynamically decides when and how to provide feedback to a user based on user performance during the lesson. By altering the timing and/or frequency by which students receive feedback, automated learning systems can improve the rate at which students effectively learn the presented material.

For example, pilot training is generally instructor-intensive, but qualified instructors can be difficult to find in quantity sufficient to meet student need. Thus, pilot trainees can often receive instruction via one or more automated learning systems in order to maximize the educational benefits of live instructor training. Further, the automated learning systems in pilot training can include training with complicated, expensive training tools such as cockpit simulators, flight simulators, etc. Improving the effectiveness and efficiency of these systems can make them more valuable to their owners and/or users. Additionally, improving the effectiveness and efficiency of automated learning tools that do not require expensive simulator time can increase the amount of time a pilot trainee can spend using the simulators.

Changing the timing by which a pilot trainee receives feedback can improve the rate at which the trainee learns the curriculum. For example, one feedback pattern can be to allow a student to make a mistake a first time with immediate correction, a second time with a first delay before correction, and a third time with a second, longer delay before correction. This can allow a student the opportunity to make mistakes within the curriculum in an amount of time not available with live instruction. Other feedback patterns, described in more detail below, can be used as well, depending on the curriculum.

Experimental results indicate that applying certain aspects of the disclosed adaptive feedback timing system have markedly improved the rate at which pilot trainees learn procedural lessons via automated learning systems. The procedural lessons include maintenance tasks, preflight checks, etc. For example, a group of students learning a forty-step preflight procedure has improved from needing to review the lesson on an automated learning system five times (on average) to learning the procedure two-to-three times on an automated learning system (on average) with improved retention.

In addition to pilot training, other types of automated learning systems can be improved without departing from the scope of the subject disclosure. For example, aircraft mechanic training, aircraft maintenance training, aircraft crew training, and other types of automated learning systems can be improved through an adaptive feedback timing system. The subject disclosure illustrates systems and methods for using an adaptive feedback timing system to improve a student's (or a group of students') use of an automated learning system to learn one or more lessons.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more processors ("processor(s)" 106 in FIG. 1), which indicates that in some implementations the system 100 includes a single processor 106 and in other implementations the system 100 includes multiple processors 106. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example system 100 for adaptive feedback, in accordance with at least one implementation of the subject disclosure. In some implementations, the system 100 includes a performance observation system 102 configured to communicate with a variable feedback teaching device 104 via monitoring data 134, error detection data 136, and/or feedback data 138. The variable feedback teaching device 104 can be configured to communicate the monitoring data 134 and the error detection data 136 to the performance observation system 102. The monitoring data 134 is associated with electronically monitoring a lesson by the variable feedback teaching device 104, while the error detection data 136 is associated with the variable feedback teaching device 104 automatically detecting an error made by a student during a lesson. The performance observation system 102 can be configured to automatically select a feedback pattern based on one or more performance history criteria 116 and communicate feedback data 138 to the variable feedback teaching device 104 for presentation to a student using the variable feedback teaching device 104 according to the automatically selected feedback pattern.

For example, a pilot trainee can use a cockpit simulator to learn a preflight check procedure. A variable feedback teaching device 104 can be incorporated into and/or coupled to a portion of the cockpit simulator program. While monitoring the pilot trainee's progress through the preflight check procedure training, the variable feedback teaching device 104 can communicate to a performance observation system 102 incorporated into and/or coupled to a portion of the cockpit simulator program. The variable feedback teaching device 104 can communicate monitoring data 134 (e.g., indicating the student's progress through the lesson) as well as error detection data 136 associated with the variable feedback teaching device 104 automatically detecting when the student made an error, at what point in the lesson the student made the error, and/or what the error was. The performance observation system 102 can automatically select a feedback pattern for the pilot trainee based on, for example, how the pilot trainee previously performed on this lesson, how other pilot trainees previously performed on this lesson, how the pilot trainee previously performed on the specific portion of the lesson in which the error was made, how the pilot trainee previously performed in other lessons, etc. As an exemplary illustration, the performance observation system 102 can automatically select a feedback pattern that indicates the user should be informed immediately of the error based at least on the fact that the user has made the same error multiple times previously. The performance observation system 102 can communicate feedback data 138 (e.g., indicating that the user answered the question incorrectly) to the variable feedback teaching device 104. The variable feedback teaching device 104 can then present the feedback data 138 to the student user immediately, according to the automatically selected feedback pattern. The example provided above is intended as an illustration to aid in understanding and should not be understood as limiting the scope of the subject disclosure.

In some implementations, the performance observation system 102 can include one or more processors 106 coupled to a memory 108. The processor(s) 106 are configured to receive monitoring data associated with electronically monitoring a lesson by a variable feedback teaching device, and to receive error detection data associated with the variable feedback teaching device 104 automatically detecting an error made by a student during the lesson, as described further below.

In some implementations, the processor(s) 106 are also configured to, after receiving the error detection data, automatically select a feedback pattern based on a performance history criterion. In a particular implementation, the processor(s) 106 can be configured to automatically select a feedback pattern from a plurality of feedback patterns. For example, a feedback pattern selector 140 can select between a first feedback pattern 120 and a second feedback pattern 122. For example, a feedback pattern can include immediately alerting the student to the error (an "immediate feedback pattern"). As an additional example, a feedback pattern can include providing feedback at a predetermined point in the lesson (a "breakpoint feedback pattern"). The predetermined point in the lesson can be selected, for example, based on a predetermined duration, an end point of a portion of the lesson, etc. The predetermined duration could include, for example, every fifteen minutes, every thirty minutes, every hour, etc. The end point of a portion of the lesson could include, for example, at the end of a particular unit, the end of a particular subject matter, etc. As a further example, a feedback pattern can include providing feedback at the end of an entire lesson (an "end-of-lesson feedback pattern").

In some implementations, the end point of the lesson can also be associated with a virtual location within a training simulation. For example, in a pilot training lesson the student can be learning a preliminary preflight procedure lesson. In a particular example, the variable feedback teaching device 104 can be incorporated into and/or coupled to a cockpit simulator. Portions of the preliminary preflight procedure lesson can be associated with one or more virtual locations within the cockpit simulator. For example, virtual locations can include above the pilot's head, behind the pilot's seat, directly under the window, etc. The end point of the lesson can be associated with one or more of these virtual locations.

In some implementations, the processor(s) 106 automatically select a feedback pattern based on one or more performance history criteria (e.g., performance history criterion 116). For example, the performance history criterion 116 can include a past performance metric associated with the student (and/or a plurality of students) at a point in the lesson at which an error was automatically detected. To illustrate, the past performance metric can indicate whether one or more students has previously made an error at the same point in the lesson (e.g., got the same question wrong). In a particular example, the past performance metric can indicate that this particular student got the same question wrong multiple (e.g., more than three) times. In another particular example, the past performance metric can indicate that a substantial percentage (e.g., more than 25%) of students taking this particular lesson has made an error at the same point in the lesson. In another particular example, the past performance metric can indicate a count (e.g., five hundred) of additional students that have previously committed the error.

In some implementations, the processor(s) 106 can automatically select an appropriate feedback pattern that causes feedback to be provided to the student according to a particular timing based on whether the student (and/or a plurality of students) has previously committed the error. For example, the processor(s) 106 can automatically select a feedback pattern that causes feedback to be provided to the student immediately if the student has previously committed the error multiple (e.g., more than three) times and/or if a substantial percentage (e.g., more than 25%) of students taking this particular lesson has made the same error. Alternatively, the processor(s) 106 can automatically select a feedback pattern that causes feedback to be provided to the student at the end of the lesson if the student has previously not committed the error and/or if a substantial percentage (e.g., more than 25%) of students taking this particular lesson has not made the same error.

Referring again to the performance history criterion 116, as an additional example the performance history criterion 116 can include a past performance metric associated with the student (and/or a plurality of students) for the lesson. To illustrate, the past performance metric can indicate whether one or more students has previously performed below a success threshold 118 for the lesson (e.g., correctly answered less than 50% of questions correctly). In some implementations, the success threshold 118 can be stored in the memory 108. The success threshold 118 can be associated with one or more threshold metrics. For example, the success threshold 118 can be associated with a particular number of questions answered correctly, a particular number of questions answered incorrectly, a particular passing percentage, a particular failure percentage, a particular high-pass percentage, etc. In a particular example, the past performance metric can indicate that this particular student has previously performed below the success threshold 118. In another particular example, the past performance metric can indicate that a substantial percentage (e.g., more than 25%) of students taking this particular lesson has performed below the success threshold 118.

In some implementations, the processor(s) 106 can automatically select an appropriate feedback pattern that causes feedback to be provided to the student according to a particular timing based on whether the student (and/or a plurality of students) has previously performed below the success threshold. For example, the processor(s) 106 can automatically select a feedback pattern that causes feedback to be provided to the student immediately if the student has previously performed below the success threshold 118 (e.g., previously failed the lesson) and/or if a substantial percentage (e.g., more than 25%) of students taking this particular lesson has previously performed below the success threshold 118 (e.g., previously failed the lesson). Alternatively, the processor(s) 106 can automatically select a feedback pattern that causes feedback to be provided to the student at the end of the lesson if the student has not previously performed below the success threshold 118 and/or if a substantial percentage (e.g., more than 25%) of students taking this particular lesson has not previously performed below the success threshold 118.

Although this illustrative example is described in terms of a student performing below a success threshold 118, the processor(s) 106 can be configured to automatically select a particular feedback pattern that causes feedback to be provided to the student according to a particular timing based on whether the student has previously performed above the success threshold 118 without departing from the scope of the subject disclosure.

Referring again to the performance history criterion 116, as a further example the performance history criterion 116 can include a past performance metric associated with the student (and/or a plurality of students) for a second lesson. To illustrate, the past performance metric can indicate whether one or more students has previously made a second error in a second lesson (e.g., the second lesson 132 described further below), where the second error is thematically similar to the error automatically detected by the variable feedback teaching device 104. In some implementations, a first error is thematically similar to a second error when the first error occurs during a portion of the lesson having the same subject matter as a portion of the second lesson during which the student (and/or a plurality of students) made the second error.

For example, a curriculum can include a plurality of lessons (e.g., the first lesson 130 and the second lesson 132). Each lesson can cover the same or similar subject matter. As a particular example, a flight training curriculum can include one or more lessons covering a procedural preflight flight training lesson, such as a preliminary preflight procedure lesson. One or more of those lessons can include portions that cover the aircraft's hydraulic system, oxygen system, etc. One or more of those lessons can include aspects that cover various locations in the cockpit (e.g., behind the student's head, behind the student's seat, right below the window, etc.). A past performance metric can indicate, for example, whether a particular student (and/or a plurality of students) has previously made an error on a portion of a previous lesson that is thematically similar to an error made during the currently tested lesson. For example, a past performance metric can indicate that the student (and/or a plurality of students) has repeatedly made an error when the subject matter tested involved something that happens over the pilot trainee's head.

In some implementations, the processor(s) 106 can automatically select an appropriate feedback pattern that causes feedback to be provided to the student according to a particular timing based on whether the student (and/or a plurality of students) has previously committed a second error thematically similar to the error automatically detected by the variable feedback teaching device 104. For example, the processor(s) 106 can automatically select a feedback pattern that causes feedback to be provided to the student immediately if the student has previously committed a thematically similar second error (e.g., missed a question covering similar subject matter in a different lesson) and/or if a substantial percentage (e.g., more than 25%) of students taking this particular lesson has previously committed a thematically-similar second error (e.g., missed a question covering similar subject matter in a different lesson). Alternatively, the processor(s) 106 can automatically select a feedback pattern that causes feedback to be provided to the student at the end of the lesson if the student and/or a plurality of students has not previously committed a thematically similar second error.

In some implementations, the processor(s) 106 can automatically select an appropriate feedback pattern that causes feedback to be provided to the student according to a particular timing based on whether the student (and/or a plurality of students) has previously committed a thematically similar second error a threshold number of times. For example, if a student has only made a thematically similar error once before, the processor(s) 106 can automatically select a feedback pattern that causes feedback to be provided to the student at the end of the lesson. Alternatively, if the student has made a thematically similar error multiple (e.g., three) times before, the processor(s) 106 can automatically select a feedback pattern that causes feedback to be provided to the student immediately.

Referring again to the performance history criterion 116, as a further example the performance history criterion 116 can include a past performance metric associated with a student's performance in an error category 124. To illustrate, the past performance metric can indicate whether the error is an incorrect answer error, an out of sequence error, or a wrong state error. An incorrect answer error can indicate that the student for example submitted the incorrect answer to a question in a lesson. For example, a trainee pilot could misidentify the purpose of a particular toggle or button. An out of sequence error can indicate that the student performed the correct actions but in the incorrect order. For example, a trainee pilot could perform the correct steps associated with a preflight engine check but performed the steps in the incorrect order. A wrong state error can indicate that the student interacted with the correct object but placed the object in the incorrect state. For example, a trainee pilot could have identified the correct switch to test a portion of the hydraulics system but left the switch in the incorrect position.

In some implementations, the error classifier 110 can be configured to classify the error automatically detected by the variable feedback teaching device 104 according to one or more error categories 124. For example, the error classifier 110 can compare different aspects of an answer in a lesson (e.g., as represented by a portion of the error detection data 136 and/or a portion of the monitoring data 134) against different aspects of one or more error categories 124. To illustrate, the monitoring data 134 can indicate that the particular portion of the lesson that the student is taking involves tasks with three components: (i) moving the first system switch (A), the second system switch (B), or the third system switch (C); (ii) into the correct positions of first system-position 1, second system-position 2, third system-position 3; (iii) in the correct order of second system, then third system, then first system. The error detection data 136 can indicate that the variable feedback teaching device 104 automatically detected an error, and that the error was associated with the student moving switch B into position 3 first. The error classifier 110 can analyze the error detection data 136 to determine that the appropriate error category 124 is one associated with a wrong state error.

In some implementations, the past performance metric can indicate whether one or more students has previously performed below a success threshold 118 for the error category (e.g., committed more than five wrong state errors). In some implementations, the success threshold 118 can be stored in the memory 108. The success threshold 118 can be associated with one or more threshold metrics. For example, the success threshold 118 can be associated with a particular number of questions answered correctly, a particular number of questions answered incorrectly, a particular passing percentage, a particular failure percentage, a particular high-pass percentage, etc. In a particular example, the past performance metric can indicate that this particular student has previously performed below the success threshold 118. In another particular example, the past performance metric can indicate that a substantial percentage (e.g., more than 25%) of students taking this particular lesson has performed below the success threshold 118.

In some implementations, the processor(s) 106 can automatically select an appropriate feedback pattern that causes feedback to be provided to the student according to a particular timing based on whether the student (and/or a plurality of students) has previously performed below the success threshold. For example, the processor(s) 106 can automatically select a feedback pattern that causes feedback to be provided to the student immediately if the student has previously performed below the success threshold 118 (e.g., previously committed more than five wrong state errors) and/or if a substantial percentage (e.g., more than 25%) of students taking this particular lesson has previously performed below the success threshold 118 (e.g., previously committed more than five wrong state errors). Alternatively, the processor(s) 106 can automatically select a feedback pattern that causes feedback to be provided to the student at the end of the lesson if the student has not previously performed below the success threshold 118 and/or if a substantial percentage (e.g., more than 25%) of students taking this particular lesson has not previously performed below the success threshold 118.

Although this illustrative example is described in terms of a student performing below a success threshold 118, the processor(s) 106 can be configured to automatically select a particular feedback pattern that causes feedback to be provided to the student according to a particular timing based on whether the student has previously performed above the success threshold 118 without departing from the scope of the subject disclosure.

Although the above description illustrates several examples, other performance history criteria 116 are possible without departing from the scope of the subject disclosure. For example, the performance history criterion 116 can include a past performance metric associated with a plurality of students for the lesson. The monitoring data 134 and the error detection data 136 can indicate that a large number of students (e.g., 50) currently learning a particular lesson are getting a large number (e.g., more than 50%) of questions wrong. The processor(s) 106 can be configured to automatically select a feedback pattern that causes feedback to be provided to the students according to a particular timing based on the past performance of the plurality of students.

As an additional example, the performance history criterion 116 can include a past performance metric associated with a plurality of students for a second lesson. The monitoring data 134 and the error detection data 136 can indicate that a large number of students (e.g., 50) committed a large number of errors (e.g., more than 50% incorrect answer errors) on a second lesson. The processor(s) 106 can be configured to automatically select a feedback pattern that causes feedback to be provided to the students according to a particular timing based on the past performance of the plurality of students for the second lesson.

In some implementations, the performance observation system 102 can be coupled to the variable feedback teaching device 104 via one or more interfaces 126. As described further above, the variable feedback teaching device 104 can be configured to communicate the monitoring data 134 and the error detection data 136 to the performance observation system 102. The monitoring data 134 can be associated with electronically monitoring a lesson by the variable feedback teaching device 104, as described further below. The error detection data 136 can be associated with the variable feedback teaching device 104 automatically detecting an error made by a student during the lesson, as described further below.

The variable feedback teaching device 104 can also be configured to receive the feedback data 138 from the performance observation system 102. The feedback data 138 can enable the variable feedback teaching device 104 to present feedback to the student according to the automatically selected feedback pattern. In some implementations, the feedback data 138 can include feedback data for direct presentation to the user by the variable feedback teaching device 104. In the same or alternative implementations, the feedback data 138 can include data associated with the automatically selected feedback pattern. In such an implementation, the variable feedback teaching device 104 can analyze the automatically selected feedback pattern to generate feedback to present to the user of the variable feedback teaching device 104.

In some implementations, the variable feedback teaching device 104 can include one or more processors 112 coupled to a memory 114. The processor(s) 112 can be configured to automatically detect an error made by a user taking one or more lessons. For example, a user can access one or more of the first lesson 130 and/or the second lesson 132 stored in the memory 114 of the variable feedback teaching device 104. In some implementations, the first lesson 130 and the second lesson 132 can be part of the same curriculum. For example, the first lesson 130 and the second lesson 132 can be part of a pilot training program. In such an example, the first lesson 130 can be a preliminary preflight procedure lesson and the second lesson 132 can be a maintenance procedure lesson. In the same or alternative implementations, the first lesson 130 and the second lesson 132 can be part of different curricula. For example, the first lesson 130 can be a portion of a pilot training program, while the second lesson 132 can be a portion of a general employee training program (e.g., an employee harassment training lesson).

In some implementations, the variable feedback teaching device 104 can be configured to automatically detect an error made by a user during a lesson by monitoring a user's input to and/or interaction with the variable feedback teaching device 104. For example, the error detector 128 can be configured to monitor a user's responses to a series of questions that require text-based responses (e.g., "What is the next step in the procedure?"), including multiple-choice, true/false, and/or other types of text-based questions. As an additional example, the error detector 128 can be configured to monitor a user's interactions with a training environment. To illustrate, the variable feedback teaching device 104 can be configured to monitor a user's movement within a virtual reality-type training environment. Those movements could include a user's body or a portion of the user's body. Those movements could also include a user's speech.

The error detector 128 can be configured to monitor a user's activity either directly or indirectly. For example, the user can provide input directly to the variable feedback teaching device 104 via one or more input/output interfaces (e.g., a keyboard, touch screen, stylus, etc.). The user can also provide input indirectly to the variable feedback teaching device 104 via one or more communication interfaces. For example, a user can use a computing device such as a tablet computer, smart phone, personal computer, etc. to directly interact with a lesson. As an additional example, a monitoring device such as a still camera, video camera, microphone, motion sensor, etc. can monitor one or more user's actions in order to track a user's interaction with a lesson. In a particular example, a video feed can be used to capture a user's actions to ensure the user is complying with safety guidelines. The computing device can then be configured to communicate data associated with the user's activity to the variable feedback teaching device 104.

The variable feedback teaching device 104 can be implemented as a stand-alone computing device (e.g., a flight simulator kiosk) and/or a component of another computing device (e.g., as an app or program running on a smart phone or laptop computer). The variable feedback teaching device 104 can also include components not illustrated in FIG. 1. For example, to monitor input from and/or interaction with a user, the variable feedback teaching device 104 can also include one or more input/output interfaces, one or more displays, one or more network interfaces, etc. Further, although FIG. 1 illustrates the memory 114 of the variable feedback teaching device 104 as storing two lessons—the first lesson 130 and the second lesson 132—more or fewer lessons can be present within the memory 108 without departing from the scope of the subject disclosure.

Although FIG. 1 illustrates certain operations occurring within the performance observation system 102 or the variable feedback teaching device 104, certain operations can be performed by other components of the system 100 without departing from the scope of the subject disclosure. For example, the variable feedback teaching device 104 can be configured to classify an error according to one or more of the error categories 124. The error detection data 136 can include data associated with the error classification. As an additional example, the performance history criterion 116 and/or the success threshold 118 can be stored by the memory 114 of the variable feedback teaching device 104. Data associated with the performance history criterion 116 and/or the success threshold 118 can be communicated to the performance observation system 102 separately and/or as part of the monitoring data 134 and/or the error detection data 136.

Further, although FIG. 1 illustrates the performance observation system 102 and the variable feedback teaching device 104 as separate, other configurations are possible without departing from the scope of the subject disclosure. For example, the performance observation system 102 and the variable feedback teaching device 104 can be integrated into the electronic device. As an additional example, some or all components of the performance observation system 102 can be integrated into the same electronic device as some or all components of the variable feedback teaching device 104. As a further example, one or more components of the performance observation system 102 and/or one or more components of the variable feedback teaching device 104 can be distributed across a plurality of computing devices (e.g., a group of servers).

Figure 2:
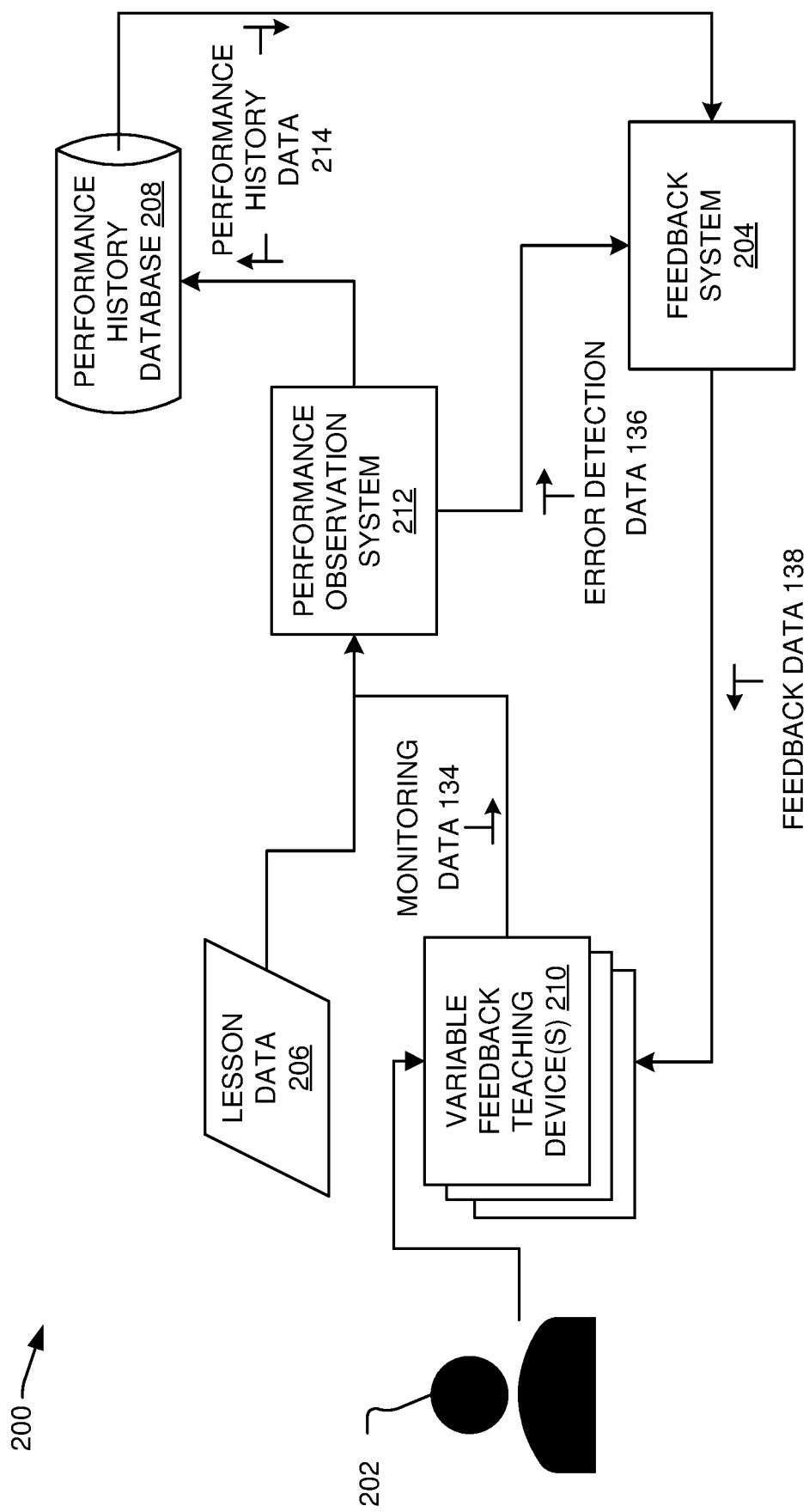
FIG. 2 depicts another example system for adaptive feedback, in accordance with the subject disclosure.

FIG. 2 depicts another example system 200 for adaptive feedback, in accordance with the subject disclosure. FIG. 2 illustrates an example system 200 that can centralize automated variable feedback for a large number of users 202 accessing one or more lessons (e.g., the first lesson 130 and/or the second lesson 132 of FIG. 1) from one or more variable feedback teaching devices 210. For example, a large corporation can configure the system 200 to provide automated variable feedback to hundreds of employees as part of a company-wide training curriculum.

In some implementations, a user 202 can access one or more lessons via one or more variable feedback teaching devices 210. Each of the variable feedback teaching device(s) 210 can be any appropriate computing device configured to communicate, to the performance observation system 212, monitoring data 134 associated with electronically monitoring a lesson; communicating, to the performance observation system 212, error detection data 136 associated with automatically detecting an error made by a student during the lesson; receiving, from the performance observation system 212, feedback data 138 associated with a feedback pattern automatically selected by the feedback system 204 based on the performance history criterion 116 of FIG. 1; and presenting the feedback data 218 to the student. For example, each of the variable feedback teaching device(s) 210 can be implemented in hardware and/or software as part of a smart phone, laptop computer, desktop computer, stand-alone training kiosk, training simulator, voice-controlled speaker system, vehicle, aircraft, wearable electronic device, etc. In a particular example, one or more variable feedback teaching devices 210 can be a digital training environment running on a personal computer, where the digital training environment resembles a three-dimensional video game-like environment for training a student on a particular process.

In some implementations, the performance observation system 212 can be configured to receive lesson data 206. In some implementations, the lesson data 206 can be associated with one or more lessons (e.g., the first lesson 130 and/or the second lesson 132 of FIG. 1) that one or more users 202 are accessing via one or more of the variable feedback teaching devices 210. The lesson data 206 can be stored as part of the performance observation system 212 (e.g., in the memory 108 of FIG. 1) and/or stored remotely from the performance observation system 212.

In some implementations, the performance observation system 212 can also be configured to receive the monitoring data 134 from the one or more variable feedback teaching devices 210. For example, as described in more detail above with reference to FIG. 1, the monitoring data 134 can be associated with, among other things, a user's actions (either direct or indirect) with a variable feedback teaching device.

In some implementations, the performance observation system 212 can also be configured to communicate performance history data 214 to a performance history database 208. In some configurations, the performance history data 214 can be communicated as raw data from the monitoring data 134, reformatted data from the monitoring data 134, modified data from the monitoring data 134 (e.g., collated, totaled, etc.), analyzed data from the monitoring data 134 (e.g., summarized, statistically analyzed, etc.), and/or some combination thereof. In some implementations, one or more processors of the performance observation system 212 can be configured to format, reformat, modify, and/or analyze the monitoring data 134. For example, the processor(s) 106 of FIG. 1 can be configured to perform a statistical analysis on the monitoring data 134 from a large number of students to determine a mean score on a particular lesson, a standard deviation, and/or other statistical parameters. The processor(s) 106 can be configured to include the statistical data (and/or data representative of the statistical data) as part of the performance history data 214.

In some implementations, the performance history database 208 can be stored as part of the performance observation system 212 (e.g., by the memory 108) or located remotely from—and coupled to—the performance observation system. The performance history database 208 can be configured to store data associated with one or more students (e.g., one or more users 202) over the course of one or more historical training sessions. For example, the performance history database 208 can be configured to store the results of a particular user 202 on every attempt the user 202 has made to learn a particular lesson (e.g., the first lesson 130) over a particular time (e.g., over the past calendar year).

In some implementations, the performance history database 208 can be configured to store data associated with the performance history of a large number of users over time. This can enable, for example, the performance observation system 212 and/or the feedback system 204 to, for example, compare the results by a particular student on a particular lesson against a large sample of the student's peers' performance on the same particular lesson. In certain implementations, the performance history database 208 can be configured to store a variety of performance history indicators associated with a student's (or a group of students) performance over time. For example, as described in more detail above with reference to FIG. 1, the performance history database 208 can be configured to store data associated with one or more student's performance at a point in the lesson at which an error was automatically detected, performance on the lesson as a whole, performance on other lessons, performance on thematically similar questions and/or lessons, a count of additional students that have committed the same and/or thematically similar errors, performance according to various error categories, etc.

The performance observation system 212 can also be configured to analyze the monitoring data 134 in real time and/or near-real time to determine whether the user 202 has made an error as part of the lesson associated with the lesson data 206, according to the monitoring data 134. As described in more detail above with reference to FIG. 1, this can include determining the particular action taken by the user satisfies the requirement(s) of the lesson data 206 (e.g., did the student provide the correct answer, did the student flip the correct switch, etc.), classifying the error according to one or more error categories, etc. The performance observation system 212 can then communicate the error detection data 136 to a feedback system 204.

In some implementations, the feedback system 204 can be coupled to the performance observation system 212 and the performance history database 208. The feedback system 204 can be configured to receive the error detection data 136 from the performance observation system 212 and to receive the performance history data 214 from the performance history database 208. In some implementations, the feedback system 204 can be configured to store the error detection data 136 and the performance history data 214 in a memory (e.g., the memory 108 of FIG. 1). The feedback system 204 can also include one or more processors (e.g., the processor(s) 106 of FIG. 1) coupled to the memory that can execute instructions that allow the feedback system 204 to compare and/or analyze the error detection data 136 and the performance history data 214 to automatically select a feedback pattern based on one or more performance history criteria, and to communicate feedback data 138 to the one or more variable feedback teaching devices 210 for presentation to the user(s) 202 according to the automatically selected feedback pattern.

For example, the feedback pattern selector 140 of FIG. 1 can analyze the error detection data 136 to determine the number of times a particular student has made the same error in a particular lesson. If the feedback pattern selector 140 determines that the student has not previously made this particular error, the feedback pattern selector 140 can select a first feedback pattern (e.g., the first feedback pattern 120 of FIG. 1) that indicates feedback should be held for the end of the lesson. If the feedback pattern selector 140 determines that the student has previously committed the same error once before, the feedback pattern selector 140 can select a second feedback pattern (e.g., the second feedback pattern 122 of FIG. 1) that indicates feedback should be held for the end of a portion of the lesson such as the end of a section. If the feedback pattern selector 140 determines that the student has previously committed the same error more than once before, the feedback pattern selector 140 can select a third feedback pattern that indicates feedback should be communicated to the student immediately.

In some embodiments, the feedback system 204 can be configured to communicate feedback data 138 to the one or more variable feedback teaching devices 210. The feedback data 138 can be data associated with the automatically selected feedback pattern and/or data associated with feedback generated according to the automatically selected feedback pattern. To illustrate using the example above, the feedback data 138 can include data representative of the third feedback pattern (e.g., provide feedback immediately). The feedback data 138 can, in addition to or alternatively, include data representative of feedback generated according to the third feedback pattern. For example, the feedback data 138 can include data representative of immediate feedback such as an instruction to interrupt the student's activity and indicate the appropriate feedback.

Although FIG. 2 illustrates a particular configuration of the system 200, other configurations are possible without departing from the scope of the subject disclosure. For example, the feedback system 204 can be coupled only to the performance observation system 212 or can be coupled to the performance history database 208 via the performance observation system 212. As an additional example, the feedback system 204 can be configured to provide the feedback data 138 to the performance observation system 212 for communication to the one or more variable feedback teaching devices 210 to minimize the number of communication connections required of the variable feedback teaching device(s) 210. As a further example, the feedback system 204 and the performance observation system 212 can be integrated into one or more computing devices, generally corresponding to the performance observation system 102 of FIG. 1.

Figure 3:
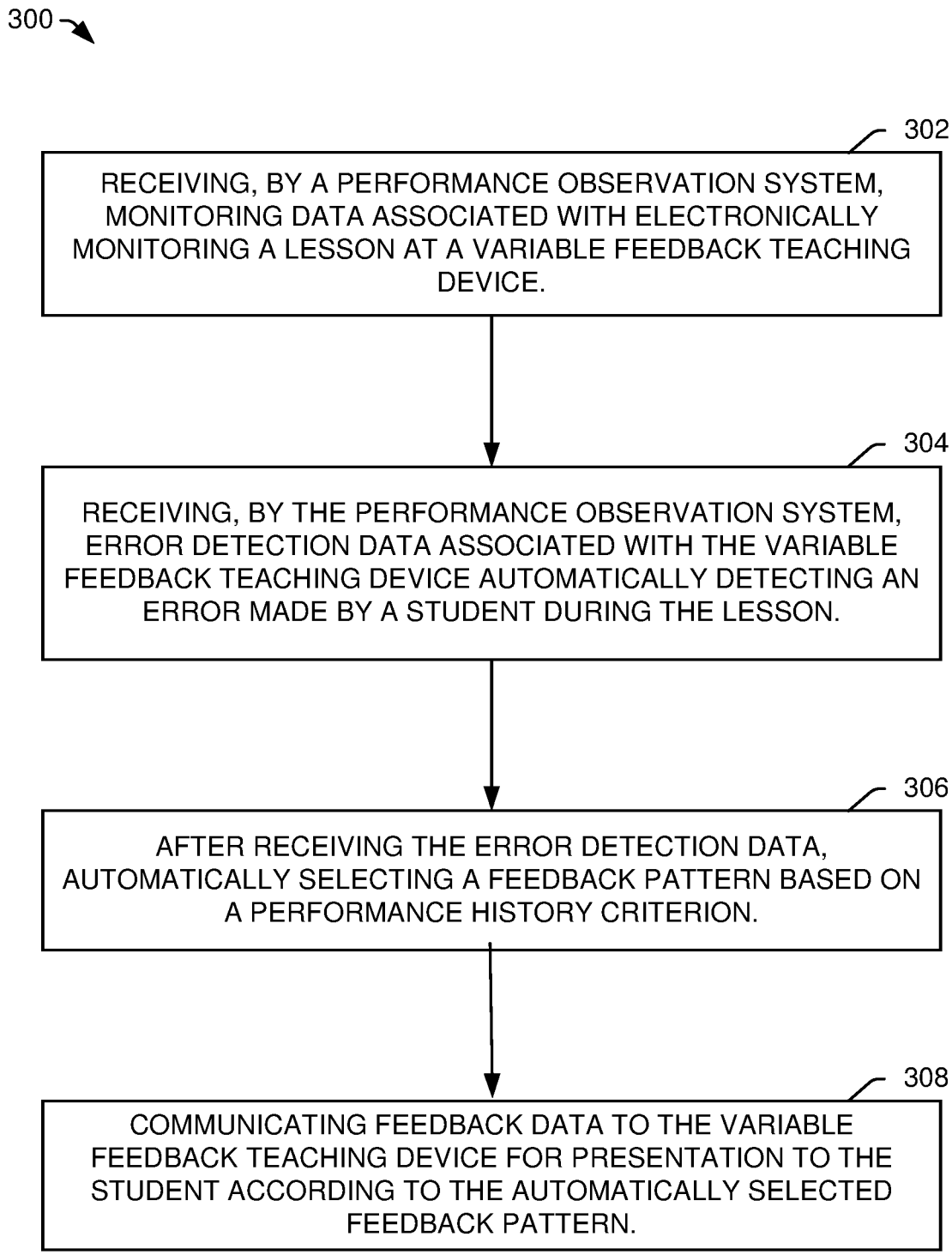
FIG. 3 is a flow chart of an example of a method for adaptive feedback, in accordance with the subject disclosure.

FIG. 3 is a flow chart of an example of a method 300 for providing an adaptive feedback timing system, in accordance with the subject disclosure. The method 300 can be initiated, performed, or controlled by one or more processors executing instructions, such as by the processor(s) 106 of FIG. 1 executing instructions from the memory 108.

In some implementations, the method 300 includes, at 302, receiving, by a performance observation system, monitoring data associated with electronically monitoring a lesson by a variable feedback teaching device. For example, the processor(s) 106 of FIG. 1 can receive the monitoring data 134 associated with electronically monitoring a first lesson 130 by a variable feedback teaching device 104.

In the example of FIG. 3, the method 300 also includes, at 304, receiving, by the performance observation system, error detection data associated with the variable feedback teaching device automatically detecting an error made by a student during the lesson. For example, the processor(s) 106 of FIG. 1 can receive the error detection data 136 associated with the variable feedback teaching device 104 automatically detecting an error made by a student during the first lesson 130.

In the example of FIG. 3, the method 300 also includes, at 306, after receiving the error detection data, automatically selecting a feedback pattern based on a performance history criterion. For example, the processor(s) 106 of FIG. 1 can, after receiving the error detection data 136, automatically select a feedback pattern from among the first feedback pattern 120 and the second feedback pattern 122 based on the performance history criterion 116.

In the example of FIG. 3, the method 300 also includes, at 308, communicating feedback data to the variable feedback teaching device for presentation to the student according to the automatically selected feedback pattern. For example, the processor(s) 106 of FIG. 1 can communicate the feedback data 138 to the variable feedback teaching device 104 for presentation to the student according to the automatically selected feedback pattern (e.g., one of the first feedback pattern 120 or the second feedback pattern 122).

Although the method 300 is illustrated as including a certain number of steps, more, fewer, and/or different steps can be included in the method 300 without departing from the scope of the subject disclosure. For example, the method 300 can vary depending on the count of available feedback patterns and/or the count of students accessing a particular lesson at a given time. For example, the method 300 can communicate feedback to a particular student prior to, or simultaneously with, automatically selecting a feedback pattern for another student.

Figure 4:
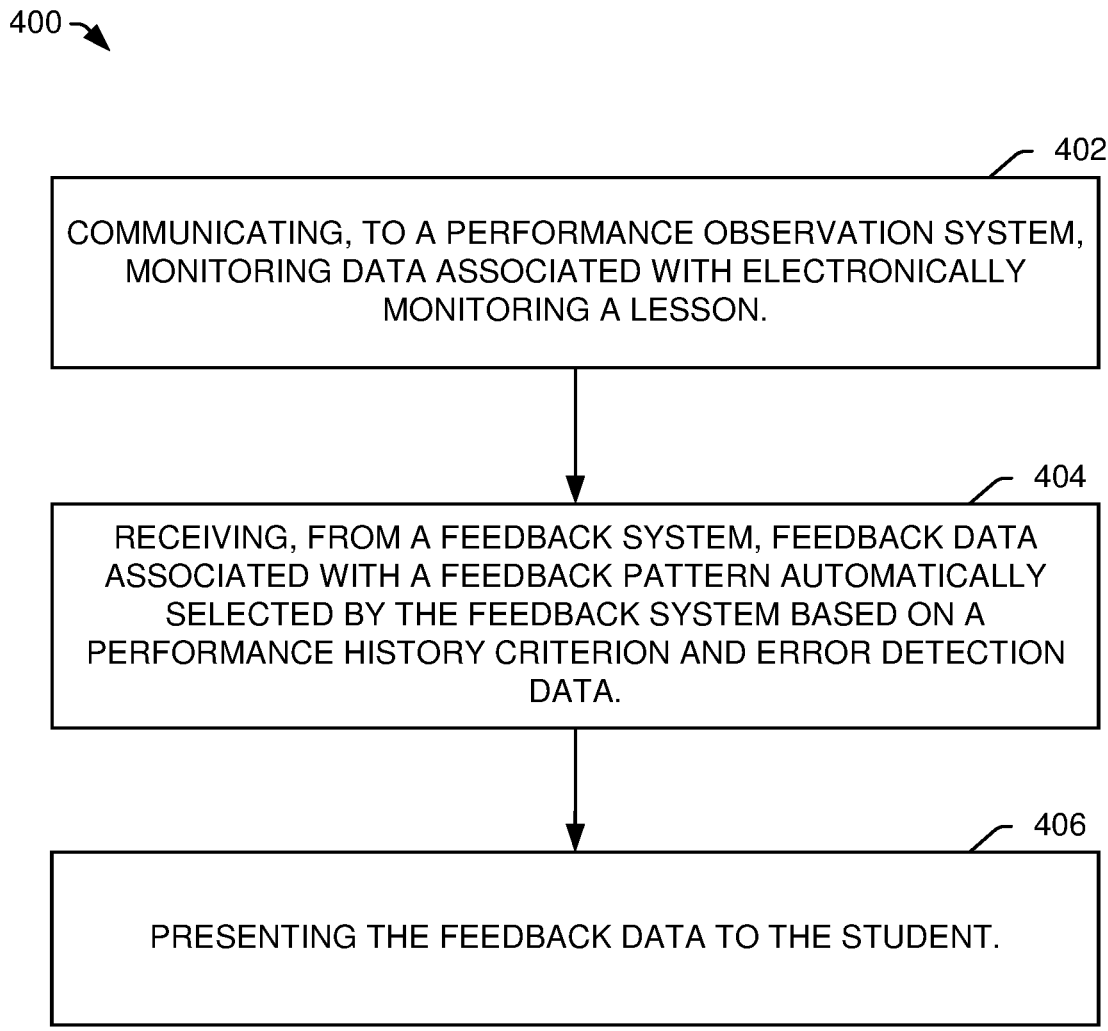
FIG. 4 is a flow chart of another example of a method for adaptive feedback, in accordance with the subject disclosure.

FIG. 4 is a flow chart of another example of a method 400 for adaptive feedback, in accordance with the subject disclosure. The method 400 can be initiated, performed, or controlled by one or more processors executing instructions, such as by the processor(s) 106 of FIG. 1 executing instructions from the memory 108.

In some implementations, the method 400 includes, at 402, communicating, to a performance observation system, monitoring data associated with electronically monitoring a lesson. For example, the variable feedback teaching device 104 of FIG. 1 can communicate to the performance observation system 102 the monitoring data 134 associated with electronically monitoring a first lesson 130.

In the example of FIG. 4, the method 400 also includes, at 404, receiving, from a feedback system, feedback data associated with a feedback pattern automatically selected by the feedback system based on a performance history criterion and error detection data. For example, the variable feedback teaching device 104 of FIG. 1 can receive from the feedback system 204, the feedback data 138 associated with the automatically selected feedback pattern (e.g., the first feedback pattern 120 or the second feedback pattern 122), where the feedback pattern was automatically selected based on the performance history criterion 116 and the error detection data 136.

In the example of FIG. 4, the method 400 also includes, at 406, presenting the feedback data to the student. For example, the variable feedback teaching device 104 can present, e.g., on a display of the variable feedback teaching device, the feedback data 138 to the student. In some implementations, the variable feedback teaching device 104 can be configured to parse, reformat, reconfigure, and/or otherwise manipulate the feedback data without departing from the scope of the subject disclosure. For example, the variable feedback teaching device 104 can be configured to format the feedback data 138 to enable presentation of the feedback data 138 via a graphical user interface of the variable feedback teaching device 104.

Although the method 400 is illustrated as including a certain number of steps, more, fewer, and/or different steps can be included in the method 400 without departing from the scope of the subject disclosure. For example, the method 400 can vary depending on the count of available feedback patterns and/or the count of students accessing a particular lesson at a given time. For example, the method 400 can receive feedback data associated with a particular student after, or simultaneously with, presenting previously received feedback data for another student.

Figure 5:
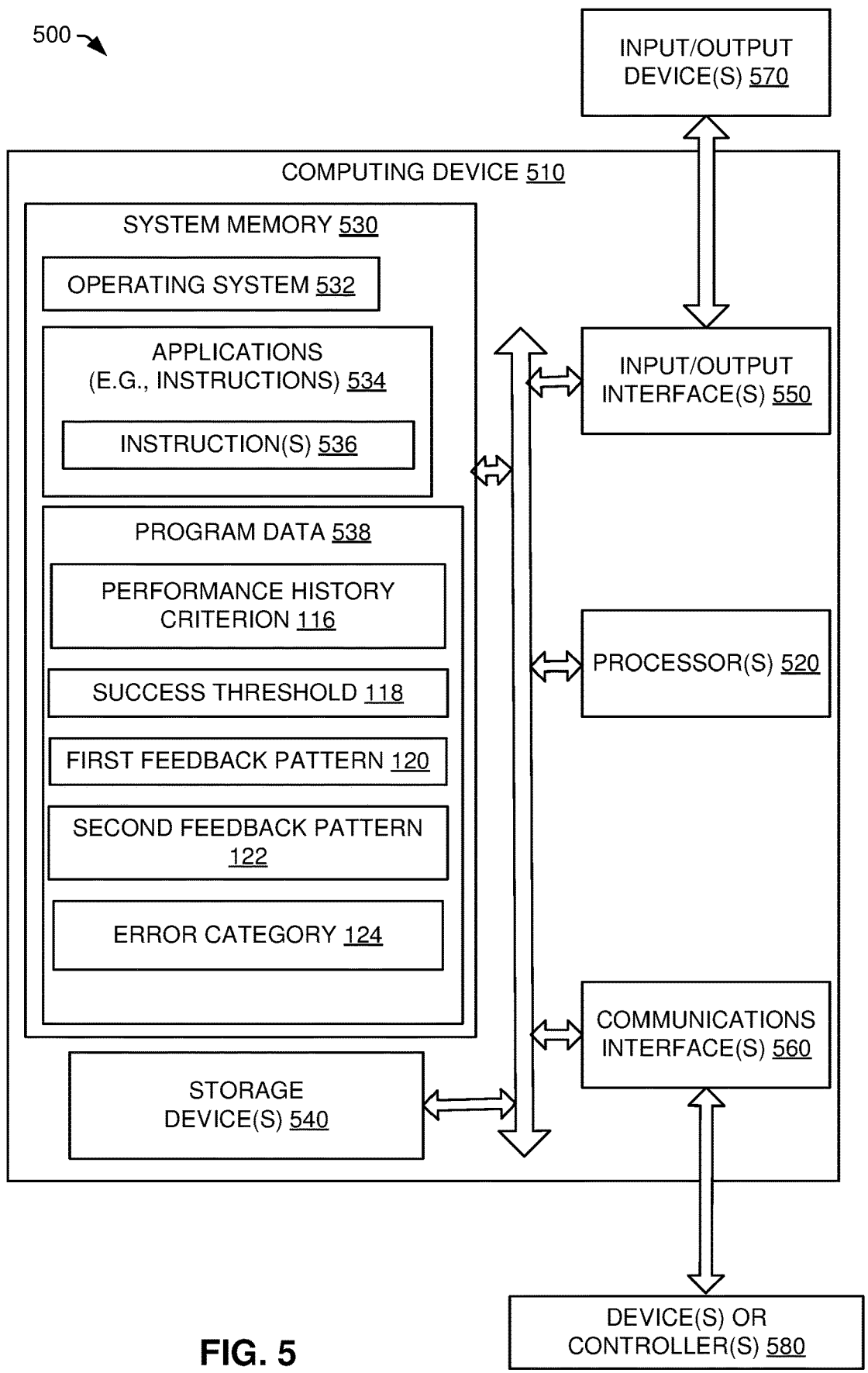
FIG. 5 is a block diagram of a computing environment including a computing device configured to support aspects of computer-implemented methods and computer-executable program instructions (or code) according to the subject disclosure.

FIG. 5 is a block diagram of a computing environment 500 including a computing device 510 configured to support aspects of computer-implemented methods and computer-executable program instructions (or code) according to the subject disclosure. For example, the computing device 510, or portions thereof, is configured to execute instructions to initiate, perform, or control one or more operations described in more detail above with reference to FIGS. 1-4. In a particular aspect, the computing device 510 can include the performance observation system 102, and/or the variable feedback teaching device(s) 104 of FIG. 1; the performance observation system 212, the feedback system 204, the variable feedback teaching device(s) 210, and/or the performance history database 208 of FIG. 2; one or more servers; one or more virtual devices; or a combination thereof.

The computing device 510 includes one or more processors 520. In a particular aspect, the processor(s) 520 correspond to the processor(s) 106 of FIG. 1. The processor(s) 520 is configured to communicate with system memory 530, one or more storage devices 540, one or more input/output interfaces 550, one or more communications interfaces 560, or any combination thereof. The system memory 530 includes volatile memory devices (e.g., random access memory (RAM) devices), nonvolatile memory devices (e.g., read-only memory (ROM) devices, programmable read-only memory, and flash memory), or both. The system memory 530 stores an operating system 532, which can include a basic input/output system for booting the computing device 510 as well as a full operating system to enable the computing device 510 to interact with users, other programs, and other devices. The system memory 530 stores system (program) data 538, such as the instructions 536, the performance history criterion 116, the success threshold(s) 118, the first feedback pattern 120, the second feedback pattern 122, the error categories 124 of FIG. 1, or a combination thereof.

The system memory 530 includes one or more applications 534 (e.g., sets of instructions) executable by the processor(s) 520. As an example, the one or more applications 534 include the instructions 536 executable by the processor(s) 520 to initiate, control, or perform one or more operations described with reference to FIGS. 1-4. To illustrate, the one or more applications 534 include the instructions 536 executable by the processor(s) 520 to initiate, control, or perform one or more operations described with reference to generating the monitoring data 134, the error detection data 136, the feedback data 138, or a combination thereof.

In a particular implementation, the system memory 530 includes a non-transitory, computer readable medium (e.g., a computer-readable storage device) storing the instructions 536 that, when executed by the processor(s) 520, cause the processor(s) 520 to initiate, perform, or control operations to automatically control a performance observation system and/or a variable feedback teaching device during an adaptive feedback timing operation.

The operations include receiving, by a performance observation system, monitoring data associated with electronically monitoring a lesson by a variable feedback teaching device. The operations also include receiving, by the performance observation system, error detection data associated with the variable feedback teaching device automatically detecting an error made by a student during the lesson. The operations also include, after receiving the error detection data, automatically selecting a feedback pattern based on a performance history criterion. The operations also include communicating feedback data to the variable feedback teaching device for presentation to the student according to the automatically selected feedback pattern.

The one or more storage devices 540 include nonvolatile storage devices, such as magnetic disks, optical disks, or flash memory devices. In a particular example, the storage devices 540 include both removable and non-removable memory devices. The storage devices 540 are configured to store an operating system, images of operating systems, applications (e.g., one or more of the applications 534), and program data (e.g., the program data 538). In a particular aspect, the system memory 530, the storage devices 540, or both, include tangible computer-readable media. In a particular aspect, one or more of the storage devices 540 are external to the computing device 510.

The one or more input/output interfaces 550 enable the computing device 510 to communicate with one or more input/output devices 570 to facilitate user interaction. For example, the one or more input/output interfaces 550 can include a display interface, an input interface, or both. For example, the input/output interface 550 is adapted to receive input from a user, to receive input from another computing device, or a combination thereof. In some implementations, the input/output interface 550 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 570 include one or more user interface devices and displays, including some combination of buttons, keyboards, pointing devices, displays, speakers, microphones, touch screens, and other devices. In a particular aspect, the input/output device(s) 570 include the interface(s) 126 of FIG. 1.

The processor(s) 520 are configured to communicate with devices or controllers 580 via the one or more communications interfaces 560. For example, the one or more communications interfaces 560 can include a network interface. The devices or controllers 580 can include, for example, the variable feedback teaching device 104 of FIG. 1.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-4. In some implementations, part or all of one or more of the operations or methods of FIGS. 1-4 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

According to Clause 1, a method includes receiving, by a performance observation system, monitoring data associated with electronically monitoring a lesson by a variable feedback teaching device. The method also includes receiving, by the performance observation system, error detection data associated with the variable feedback teaching device automatically detecting an error made by a student during the lesson. The method also includes, after receiving the error detection data, automatically selecting a feedback pattern based on a performance history criterion. The method also includes communicating feedback data to the variable feedback teaching device for presentation to the student according to the automatically selected feedback pattern.

Clause 2 includes the method of Clause 1, wherein the feedback pattern is automatically selected from among an immediate feedback pattern, a breakpoint feedback pattern, and an end-of-lesson feedback pattern.

Clause 3 includes the method of any of Clauses 1-2, wherein the performance history criterion includes a past performance metric associated with the student at a point in the lesson at which the error was automatically detected.

Clause 4 includes the method of Clause 3, wherein: the past performance metric indicates whether the student has previously committed the error; and automatically selecting the feedback pattern includes automatically selecting, from a plurality of feedback patterns, a particular feedback pattern that causes feedback to be provided to the student according to a particular timing based on whether the student has previously committed the error.

Clause 5 includes the method of any of Clauses 1-4, wherein the performance history criterion includes a past performance metric associated with the student for the lesson.

Clause 6 includes the method of Clause 5, wherein: the past performance metric indicates whether the student has previously performed below a success threshold for the lesson; and automatically selecting the feedback pattern includes automatically selecting, from a plurality of feedback patterns, a particular feedback pattern that causes feedback to be provided to the student according to a particular timing based on whether the student has previously performed below the success threshold.

Clause 7 includes the method of any of Clauses 1-6, wherein the performance history criterion includes a past performance metric associated with the student for a second lesson.

Clause 8 includes the method of Clause 7, wherein: the past performance metric indicates whether the student has made a second error in the second lesson, wherein the second error is thematically similar to the error; and automatically selecting the feedback pattern includes, in response to determining that the error is thematically similar to the second error, automatically selecting, from a plurality of feedback patterns, a particular feedback pattern that causes feedback to be provided to the student according to a particular timing based on whether the student committed the second error.

Clause 9 includes the method of Clause 8, further including determining that the error is thematically similar to the second error based on the error occurring during a portion of the lesson having the same subject matter as a portion of the second lesson during which the student made the second error.

Clause 10 includes the method of any of Clauses 1-9, wherein the performance history criterion includes a past performance metric associated with a plurality of students at a point in the lesson at which the error was automatically detected.

Clause 11 includes the method of Clause 10, wherein: the past performance metric indicates a count of additional students that have committed the error; and automatically selecting the feedback pattern includes automatically selecting, from a plurality of feedback patterns, a particular feedback pattern that causes feedback to be provided to the student according to a particular timing based on a comparison of the count of additional students that committed the error to a group performance threshold.

Clause 12 includes the method of any of Clauses 1-11, wherein the performance history criterion includes a past performance metric associated with a plurality of students for the lesson.

Clause 13 includes the method of any of Clauses 1-12, wherein the performance history criterion includes a past performance metric associated with a plurality of students for a second lesson.

Clause 14 includes the method of any of Clauses 1-13, further including, after automatically detecting the error, classifying the error according to an error category.

Clause 15 includes the method of Clause 14, wherein the error category is one of an incorrect answer category, an out of sequence category, or a wrong state category.

Clause 16 includes the method of Clause 15, wherein the performance history criterion includes a past performance metric associated with a student's performance in the error category.

Clause 17 includes the method of Clause 16, wherein: the past performance metric indicates whether the student has previously performed below a success threshold associated with the error category; and automatically selecting the feedback pattern includes automatically selecting, from a plurality of feedback patterns, a particular feedback pattern that causes feedback to be provided to the student according to a particular timing based on whether the student has previously performed below the success threshold associated with the error category.

Clause 18 includes the method of any of Clauses 1-17, wherein the automatically selected feedback pattern includes immediately alerting the student to the error.

Clause 19 includes the method of any of Clauses 1-17, wherein the automatically selected feedback pattern includes automatically providing feedback at a predetermined point in the lesson.

Clause 20 includes the method of Clause 19, wherein the predetermined point is selected based on a predetermined duration.

Clause 21 includes the method of Clause 19, wherein the predetermined point is selected based on an end point of a portion of the lesson.

Clause 22 includes the method of Clause 21, wherein the end point of the lesson is associated with a virtual location within a training simulation.

Clause 23 includes the method of any of Clauses 1-22, wherein the lesson includes a flight training lesson.

Clause 24 includes the method of Clause 23, wherein the lesson includes a flight simulation lesson.

Clause 25 includes the method of Clause 24, wherein the lesson includes a crew resource management lesson.

Clause 26 includes the method of Clause 24, wherein the lesson includes a procedural flight training lesson.

Clause 27 includes the method of Clause 26, wherein the lesson includes a preliminary preflight procedure lesson.

Clause 28 includes the method of Clause 27, wherein the performance history criterion is associated with past performance of the student on the procedural flight training lesson.

According to Clause 29, a method includes communicating, to a performance observation system, monitoring data associated with electronically monitoring a lesson.

The method also includes receiving, from a feedback system, feedback data associated with a feedback pattern automatically selected by the feedback system based on a performance history criterion and error detection data. The method also includes presenting the feedback data to the student.

Clause 30 includes the method of Clause 29, wherein the feedback pattern is automatically selected from among an immediate feedback pattern, a breakpoint feedback pattern, and an end-of-lesson feedback pattern.

Clause 31 includes the method of any of Clauses 29-30, wherein the performance history criterion includes a past performance metric associated with the student at a point in the lesson at which the error was automatically detected.

Clause 32 includes the method of Clause 31, wherein: the past performance metric indicates whether the student has previously committed the error; and automatically selecting the feedback pattern includes automatically selecting, from a plurality of feedback patterns, a particular feedback pattern that causes feedback to be provided to the student according to a particular timing based on whether the student has previously committed the error.

Clause 33 includes the method of any of Clauses 29-32, wherein the performance history criterion includes a past performance metric associated with the student for the lesson.

Clause 34 includes the method of Clause 33, wherein: the past performance metric indicates whether the student has previously performed below a success threshold for the lesson; and automatically selecting the feedback pattern includes automatically selecting, from a plurality of feedback patterns, a particular feedback pattern that causes feedback to be provided to the student according to a particular timing based on whether the student has previously performed below the success threshold.

Clause 35 includes the method of any of Clauses 29-34, wherein the performance history criterion includes a past performance metric associated with the student for a second lesson.

Clause 36 includes the method of Clause 35, wherein the past performance metric indicates whether the student has made a second error in the second lesson, wherein the second error is thematically similar to the error; and automatically selecting the feedback pattern includes, in response to determining that the error is thematically similar to the second error, automatically selecting, from a plurality of feedback patterns, a particular feedback pattern that causes feedback to be provided to the student according to a particular timing based on whether the student committed the second error.

Clause 37 includes the method of Clause 36, further including determining that the error is thematically similar to the second error based on the error occurring during a portion of the lesson having the same subject matter as a portion of the second lesson during which the student made the second error.

Clause 38 includes the method of any of Clauses 29-37, wherein the performance history criterion includes a past performance metric associated with a plurality of students at a point in the lesson at which the error was automatically detected.

Clause 39 includes the method of Clause 38, wherein: the past performance metric indicates a count of additional students that have committed the error; and automatically selecting the feedback pattern includes automatically selecting, from a plurality of feedback patterns, a particular feedback pattern that causes feedback to be provided to the student according to a particular timing based on a comparison of the count of additional students that committed the error to a group performance threshold.

Clause 40 includes the method of any of Clauses 29-39, wherein the performance history criterion includes a past performance metric associated with a plurality of students for the lesson.

Clause 41 includes the method of any of Clauses 29-40, wherein the performance history criterion includes a past performance metric associated with a plurality of students for a second lesson.

Clause 42 includes the method of any of Clauses 29-41, further including, after automatically detecting the error, classifying the error according to an error category.

Clause 43 includes the method of Clause 42, wherein the error category is one of an incorrect answer category, an out of sequence category, or a wrong state category.

Clause 44 includes the method of Clause 43, wherein the performance history criterion includes a past performance metric associated with a student's performance in the error category.

Clause 45 includes the method of Clause 44, wherein: the past performance metric indicates whether the student has previously performed below a success threshold associated with the error category; and automatically selecting the feedback pattern includes automatically selecting, from a plurality of feedback patterns, a particular feedback pattern that causes feedback to be provided to the student according to a particular timing based on whether the student has previously performed below the success threshold associated with the error category.

Clause 46 includes the method of any of Clauses 29-45, wherein the automatically selected feedback pattern includes immediately alerting the student to the error.

Clause 47 includes the method of any of Clauses 29-45, wherein the automatically selected feedback pattern includes automatically providing feedback at a predetermined point in the lesson.

Clause 48 includes the method of Clause 47, wherein the predetermined point is selected based on a predetermined duration.

Clause 49 includes the method of Clause 47, wherein the predetermined point is selected based on an end point of a portion of the lesson.

Clause 50 includes the method of Clause 47, wherein the end point of the lesson is associated with a virtual location within a training simulation.

Clause 51 includes the method of any of Clauses 29-50, wherein the lesson includes a flight training lesson.

Clause 52 includes the method of Clause 51, wherein the lesson includes a flight simulation lesson.

Clause 53 includes the method of Clause 52, wherein the lesson includes a crew resource management lesson.

Clause 54 includes the method of Clause 53, wherein the lesson includes a procedural flight training lesson.

Clause 55 includes the method of Clause 54, wherein the lesson includes a preliminary preflight procedure lesson.

Clause 56 includes the method of Clause 54, wherein the performance history criterion is associated with past performance of the student on the procedural flight training lesson.

According to Clause 57, a non-transient, computer-readable medium storing instructions executable by one or more processors to perform operations that include receiving, by a performance observation system, monitoring data associated with electronically monitoring a lesson by a variable feedback teaching device. The operations also include receiving, by the performance observation system, error detection data associated with the variable feedback teaching device automatically detecting an error made by a student during the lesson. The operations also include, after receiving the error detection data, automatically selecting a feedback pattern based on a performance history criterion. The operations also include communicating feedback data to the variable feedback teaching device for presentation to the student according to the automatically selected feedback pattern.

Clause 58 includes the non-transient, computer-readable medium of Clause 57, wherein the performance history criterion includes a past performance metric associated with the student at a point in the lesson at which the error was automatically detected.

Clause 59 includes the non-transient, computer-readable medium of Clause 58, wherein: the past performance metric indicates whether the student has previously committed the error; and automatically selecting the feedback pattern includes automatically selecting, from a plurality of feedback patterns, a particular feedback pattern that causes feedback to be provided to the student according to a particular timing based on whether the student has previously committed the error.

Clause 60 includes the non-transient, computer-readable medium of any of Clauses 57-59, wherein the performance history criterion includes a past performance metric associated with the student for the lesson.

Clause 61 includes the non-transient, computer-readable medium of Clause 60, wherein: the past performance metric indicates whether the student has previously performed below a success threshold for the lesson; and automatically selecting the feedback pattern includes automatically selecting, from a plurality of feedback patterns, a particular feedback pattern that causes feedback to be provided to the student according to a particular timing based on whether the student has previously performed below the success threshold.

Clause 62 includes the non-transient, computer-readable medium of any of Clauses 57-61, wherein the performance history criterion includes a past performance metric associated with the student for a second lesson.

Clause 63 includes the non-transient, computer-readable medium of Clause 62, wherein: the past performance metric indicates whether the student has made a second error in the second lesson, wherein the second error is thematically similar to the error; and automatically selecting the feedback pattern includes, in response to determining that the error is thematically similar to the second error, automatically selecting, from a plurality of feedback patterns, a particular feedback pattern that causes feedback to be provided to the student according to a particular timing based on whether the student committed the second error.

Clause 64 includes the non-transient, computer-readable medium of Clause 63, further including determining that the error is thematically similar to the second error based on the error occurring during a portion of the lesson having the same subject matter as a portion of the second lesson during which the student made the second error.

Clause 65 includes the non-transient, computer-readable medium of any of Clauses 57-64, wherein the performance history criterion includes a past performance metric associated with a plurality of students at a point in the lesson at which the error was automatically detected.

Clause 66 includes the non-transient, computer-readable medium of Clause 65, wherein: the past performance metric indicates a count of additional students that have committed the error; and automatically selecting the feedback pattern includes automatically selecting, from a plurality of feedback patterns, a particular feedback pattern that causes feedback to be provided to the student according to a particular timing based on a comparison of the count of additional students that committed the error to a group performance threshold.

Clause 67 includes the non-transient, computer-readable medium of any of Clauses 57-66, wherein the performance history criterion includes a past performance metric associated with a plurality of students for the lesson.

Clause 68 includes the non-transient, computer-readable medium of any of Clauses 57-67, wherein the performance history criterion includes a past performance metric associated with a plurality of students for a second lesson.

Clause 69 includes the non-transient, computer-readable medium of any of Clauses 57-68, further including, after automatically detecting the error, classifying the error according to an error category.

Clause 70 includes the non-transient, computer-readable medium of Clause 69, wherein the error category is one of an incorrect answer category, an out of sequence category, or a wrong state category.

Clause 71 includes the non-transient, computer-readable medium of Clause 70, wherein the performance history criterion includes a past performance metric associated with a student's performance in the error category.

Clause 72 includes the non-transient, computer-readable medium of Clause 71, wherein: the past performance metric indicates whether the student has previously performed below a success threshold associated with the error category; and automatically selecting the feedback pattern includes automatically selecting, from a plurality of feedback patterns, a particular feedback pattern that causes feedback to be provided to the student according to a particular timing based on whether the student has previously performed below the success threshold associated with the error category.

Clause 73 includes the non-transient, computer-readable medium of any of Clauses 57-72, wherein the automatically selected feedback pattern includes immediately alerting the student to the error.

Clause 74 includes the non-transient, computer-readable medium of any of Clauses 57-72, wherein the automatically selected feedback pattern includes automatically providing feedback at a predetermined point in the lesson.

Clause 75 includes the non-transient, computer-readable medium of Clause 74, wherein the predetermined point is selected based on a predetermined duration.

Clause 76 includes the non-transient, computer-readable medium of Clause 74, wherein the predetermined point is selected based on an end point of a portion of the lesson.

Clause 77 includes the non-transient, computer-readable medium of Clause 74, wherein the end point of the lesson is associated with a virtual location within a training simulation.

Clause 78 includes the non-transient, computer-readable medium of any of Clauses 57-77, wherein the lesson includes a flight training lesson.

Clause 79 includes the non-transient, computer-readable medium of Clause 78, wherein the lesson includes a flight simulation lesson.

Clause 80 includes the non-transient, computer-readable medium of Clause 79, wherein the lesson includes a crew resource management lesson.

Clause 81 includes the non-transient, computer-readable medium of Clause 80, wherein the lesson includes a procedural flight training lesson.

Clause 82 includes the non-transient, computer-readable medium of Clause 81, wherein the lesson includes a preliminary preflight procedure lesson.

Clause 83 includes the non-transient, computer-readable medium of Clause 81, wherein the performance history criterion is associated with past performance of the student on the procedural flight training lesson.

According to Clause 84, a system includes a memory configured to store instructions. The system also includes one or more processors configured to receive, by a performance observation system, monitoring data associated with electronically monitoring a lesson by a variable feedback teaching device. The one or more processors are also configured to receive, by the performance observation system, error detection data associated with the variable feedback teaching device automatically detecting an error made by a student during the lesson. The one or more processors are also configured to, after receiving the error detection data, automatically select a feedback pattern based on a performance history criterion. The one or more processors are also configured to communicate feedback data to the variable feedback teaching device for presentation to the student according to the automatically selected feedback pattern.

Clause 85 includes the system of Clause 84, wherein the performance history criterion includes a past performance metric associated with the student at a point in the lesson at which the error was automatically detected.

Clause 86 includes the system of Clause 85, wherein: the past performance metric indicates whether the student has previously committed the error; and automatically selecting the feedback pattern includes automatically selecting, from a plurality of feedback patterns, a particular feedback pattern that causes feedback to be provided to the student according to a particular timing based on whether the student has previously committed the error.

Clause 87 includes the system of any of Clauses 84-86, wherein the performance history criterion includes a past performance metric associated with the student for the lesson.

Clause 88 includes the system of Clause 87, wherein: the past performance metric indicates whether the student has previously performed below a success threshold for the lesson; and automatically selecting the feedback pattern includes automatically selecting, from a plurality of feedback patterns, a particular feedback pattern that causes feedback to be provided to the student according to a particular timing based on whether the student has previously performed below the success threshold.

Clause 89 includes the system of any of Clauses 84-88, wherein the performance history criterion includes a past performance metric associated with the student for a second lesson.

Clause 90 includes the system of Clause 89, wherein: the past performance metric indicates whether the student has made a second error in the second lesson, wherein the second error is thematically similar to the error; and automatically selecting the feedback pattern includes, in response to determining that the error is thematically similar to the second error, automatically selecting, from a plurality of feedback patterns, a particular feedback pattern that causes feedback to be provided to the student according to a particular timing based on whether the student committed the second error.

Clause 91 includes the system of Clause 90, wherein the one or more processors are further configured to determine that the error is thematically similar to the second error based on the error occurring during a portion of the lesson having the same subject matter as a portion of the second lesson during which the student made the second error.

Clause 92 includes the system of any of Clauses 84-91, wherein the performance history criterion includes a past performance metric associated with a plurality of students at a point in the lesson at which the error was automatically detected.

Clause 93 includes the system of Clause 92, wherein: the past performance metric indicates a count of additional students that have committed the error; and automatically selecting the feedback pattern includes automatically selecting, from a plurality of feedback patterns, a particular feedback pattern that causes feedback to be provided to the student according to a particular timing based on a comparison of the count of additional students that committed the error to a group performance threshold.

Clause 94 includes the system of any of Clauses 84-93, wherein the performance history criterion includes a past performance metric associated with a plurality of students for the lesson.

Clause 95 includes the system of any of Clauses 84-94, wherein the performance history criterion includes a past performance metric associated with a plurality of students for a second lesson.

Clause 96 includes the system of any of Clauses 84-95, further including, after automatically detecting the error, classifying the error according to an error category.

Clause 97 includes the system of Clause 96, wherein the error category is one of an incorrect answer category, an out of sequence category, or a wrong state category.

Clause 98 includes the system of Clause 97, wherein the performance history criterion includes a past performance metric associated with a student's performance in the error category.

Clause 99 includes the system of Clause 98, wherein: the past performance metric indicates whether the student has previously performed below a success threshold associated with the error category; and automatically selecting the feedback pattern includes automatically selecting, from a plurality of feedback patterns, a particular feedback pattern that causes feedback to be provided to the student according to a particular timing based on whether the student has previously performed below the success threshold associated with the error category.

Clause 100 includes the system of any of Clauses 84-99, wherein the automatically selected feedback pattern includes immediately alerting the student to the error.

Clause 101 includes the system of any of Clauses 84-99, wherein the automatically selected feedback pattern includes automatically providing feedback at a predetermined point in the lesson.

Clause 102 includes the system of Clause 101, wherein the predetermined point is selected based on a predetermined duration.

Clause 103 includes the system of Clause 101, wherein the predetermined point is selected based on an end point of a portion of the lesson.

Clause 104 includes the system of Clause 101, wherein the end point of the lesson is associated with a virtual location within a training simulation.

Clause 105 includes the system of any of Clauses 84-104, wherein the lesson includes a flight training lesson.

Clause 106 includes the system of Clause 105, wherein the lesson includes a flight simulation lesson.

Clause 107 includes the system of Clause 106, wherein the lesson includes a crew resource management lesson.

Clause 108 includes the system of Clause 107, wherein the lesson includes a procedural flight training lesson.

Clause 109 includes the system of Clause 108, wherein the lesson includes a preliminary preflight procedure lesson.

Clause 110 includes the system of Clause 107, wherein the performance history criterion is associated with past performance of the student on the procedural flight training lesson.

Clause 111 includes the system of any of Clauses 84-110, wherein the variable feedback teaching device is incorporated into a cockpit simulator.

Clause 112 includes the system of any of Clauses 84-111, wherein the variable feedback teaching device is coupled to a cockpit simulator.

Clause 113 includes the method of any of Clauses 1-56, wherein the variable feedback teaching device is incorporated into a cockpit simulator.

Clause 114 includes the method of any of Clauses 1-56, wherein the variable feedback teaching device is coupled to a cockpit simulator.

Clause 115 includes the non-transient, computer readable medium of any of Clauses 57-83, wherein the variable feedback teaching device is incorporated into a cockpit simulator.

Clause 116 includes the non-transient, computer readable medium of any of Clauses 57-83, wherein the variable feedback teaching device is coupled to a cockpit simulator.

What is claimed is:

1. A method comprising:
    receiving, by a performance observation system, monitoring data associated with electronically monitoring a lesson by a variable feedback teaching device;
    receiving, by the performance observation system, error detection data associated with the variable feedback teaching device automatically detecting an error made by a student during the lesson;
    after receiving the error detection data, automatically selecting a feedback pattern based on a performance history criterion, wherein the performance history criterion comprises a past performance metric associated with the student at a point in the lesson at which the error was automatically detected, and wherein the past performance metric indicates whether the student has previously committed the error, and wherein automatically selecting the feedback pattern comprises automatically selecting, from a plurality of feedback patterns, a particular feedback pattern that causes feedback to be provided to the student according to a particular timing based on whether the student has previously committed the error; and
    communicating feedback data to the variable feedback teaching device for presentation to the student according to the automatically selected feedback pattern.

2. The method of claim 1, wherein the feedback pattern is automatically selected from among an immediate feedback pattern, a breakpoint feedback pattern, and an end-of-lesson feedback pattern, further comprising, after automatically detecting the error, classifying the error according to an error category, wherein the error category is one of an incorrect answer category, an out of sequence category, or a wrong state category, wherein the performance history criterion further comprises a second past performance metric associated with the student for the lesson, a second past performance metric associated with the student for a second lesson, or a combination thereof.

3. The method of claim 1, wherein the feedback pattern is automatically selected from among an immediate feedback pattern, a breakpoint feedback pattern, and an end-of-lesson feedback pattern.

4. The method of claim 1, wherein the variable feedback teaching device is incorporated into a cockpit simulator.

5. The method of claim 1, wherein the performance history criterion further comprises a second past performance metric associated with the student for the lesson.

6. The method of claim 5, wherein the second past performance metric indicates whether the student has previously performed below a success threshold for the lesson, and wherein automatically selecting the feedback pattern comprises automatically selecting, from a plurality of feedback patterns, a particular feedback pattern that causes feedback to be provided to the student according to a particular timing based on whether the student has previously performed below the success threshold.

7. The method of claim 1, wherein the performance history criterion further comprises a second past performance metric associated with the student for a second lesson.

8. The method of claim 7, wherein the second past performance metric indicates whether the student has made a second error in the second lesson, wherein the second error is thematically similar to the error, and wherein automatically selecting the feedback pattern comprises, in response to determining that the error is thematically similar to the second error, automatically selecting, from a plurality of feedback patterns, a particular feedback pattern that causes feedback to be provided to the student according to a particular timing based on whether the student committed the second error.

9. The method of claim 8, further comprising determining that the error is thematically similar to the second error based on the error occurring during a portion of the lesson having the same subject matter as a portion of the second lesson during which the student made the second error.

10. The method of claim 1, wherein the performance history criterion further comprises a second past performance metric associated with a plurality of students at a point in the lesson at which the error was automatically detected.

11. The method of claim 10, wherein the second past performance metric indicates a count of additional students that have committed the error, and wherein automatically selecting the feedback pattern comprises automatically selecting, from a plurality of feedback patterns, a particular feedback pattern that causes feedback to be provided to the student according to a particular timing based on a comparison of the count of additional students that committed the error to a group performance threshold.

12. The method of claim 1, wherein the performance history criterion further comprises a second past performance metric associated with a plurality of students for the lesson or with a plurality of students for a second lesson.

13. The method of claim 1, further comprising, after automatically detecting the error, classifying the error according to an error category, wherein the error category is one of an incorrect answer category, an out of sequence category, or a wrong state category.

14. The method of claim 13, wherein the performance history criterion further comprises a second past performance metric associated with a student's performance in the error category.

15. The method of claim 14, wherein the second past performance metric indicates whether the student has previously performed below a success threshold associated with the error category, and wherein automatically selecting the feedback pattern comprises automatically selecting, from a plurality of feedback patterns, a particular feedback pattern that causes feedback to be provided to the student according to a particular timing based on whether the student has previously performed below the success threshold associated with the error category.

16. A non-transient, computer-readable medium storing instructions executable by one or more processors to perform operations comprising:
   receiving, by a performance observation system, monitoring data associated with electronically monitoring a lesson by a variable feedback teaching device;
   receiving, by the performance observation system, error detection data associated with the variable feedback teaching device automatically detecting an error made by a student during the lesson;
   after receiving the error detection data, automatically selecting a feedback pattern based on a performance history criterion, wherein the performance history criterion comprises a past performance metric associated with the student at a point in the lesson at which the error was automatically detected, and wherein the past performance metric indicates whether the student has previously committed the error, and wherein automatically selecting the feedback pattern comprises automatically selecting, from a plurality of feedback patterns, a particular feedback pattern that causes feedback to be provided to the student according to a particular timing based on whether the student has previously committed the error; and
   communicating feedback data to the variable feedback teaching device for presentation to the student according to the automatically selected feedback pattern.

17. The non-transient, computer-readable medium of claim 16, wherein the feedback pattern is automatically selected from among an immediate feedback pattern, a breakpoint feedback pattern, and an end-of-lesson feedback pattern.

18. A system comprising:
   a memory configured to store instructions; and
   one or more processors configured to:
      receive, by a performance observation system, monitoring data associated with electronically monitoring a lesson by a variable feedback teaching device;
      receive, by the performance observation system, error detection data associated with the variable feedback teaching device automatically detecting an error made by a student during the lesson;
      after receiving the error detection data, automatically select a feedback pattern based on a performance history criterion, wherein the performance history criterion comprises a past performance metric associated with a plurality of students at a point in the lesson at which the error was automatically detected, and wherein the past performance metric indicates a count of additional students that have committed the error, and wherein automatically selecting the feedback pattern comprises automatically selecting, from a plurality of feedback patterns, a particular feedback pattern that causes feedback to be provided to the student according to a particular timing based on a comparison of the count of additional students that committed the error to a group performance threshold; and
      communicate feedback data to the variable feedback teaching device for presentation to the student according to the automatically selected feedback pattern.

19. The system of claim 18, wherein the variable feedback teaching device is incorporated into a cockpit simulator.

20. The system of claim 18, wherein the variable feedback teaching device is coupled to a cockpit simulator.

* * * * *